(12) United States Patent
Miah (10) Patent No.: US 8,336,520 B2
(45) Date of Patent: *Dec. 25, 2012

(54) VEHICLE LAUNCH ANTICIPATION

(75) Inventor: Sayid Miah, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,896

(22) Filed: Nov. 29, 2011

(65) Prior Publication Data

US 2012/0109501 A1   May 3, 2012

Related U.S. Application Data

(62) Division of application No. 12/917,592, filed on Nov. 2, 2010, now Pat. No. 8,086,391.

(51) Int. Cl.
*F02B 33/00* (2006.01)

(52) U.S. Cl. .............. 123/320; 701/70; 123/339.16

(58) Field of Classification Search ............... 701/70, 701/78, 83, 113, 114; 123/320, 323, 339.16, 123/309.17, 345–348, 406.11
See application file for complete search history.

(56) References Cited

U.S. PATENT DOCUMENTS

| 5,064,423 | A | 11/1991 | Lorenz et al. |
|---|---|---|---|
| 5,771,695 | A | 6/1998 | Halimi |
| 5,906,098 | A | 5/1999 | Woollenweber |
| 6,219,611 | B1 | 4/2001 | Russell |
| 6,547,344 | B2 | 4/2003 | Hada et al. |
| 6,782,877 | B2 | 8/2004 | Nau et al. |
| 7,182,412 | B2 | 2/2007 | Ogawa |
| 7,934,485 | B2 * | 5/2011 | Ota et al. ............... 123/350 |
| 8,086,391 | B2 * | 12/2011 | Miah ..................... 701/113 |
| 2002/0062815 | A1 | 5/2002 | Kim |
| 2005/0000217 | A1 | 1/2005 | Nau et al. |
| 2007/0050118 | A1 | 3/2007 | Murray |
| 2007/0107427 | A1 | 5/2007 | Hofstetter |
| 2008/0035106 | A1 | 2/2008 | Stein |
| 2009/0151339 | A1 | 6/2009 | Doring |
| 2009/0157270 | A1 | 6/2009 | Frauenkron et al. |
| 2011/0144876 | A1* | 6/2011 | Miah ....................... 701/70 |

FOREIGN PATENT DOCUMENTS

| KR | 20040031221 A | 4/2004 |
|---|---|---|
| KR | 20040041423 A | 5/2004 |

* cited by examiner

*Primary Examiner* — John Kwon
(74) *Attorney, Agent, or Firm* — O'Brien Jones PLLC; Raymond L. Coppiellie (57) ABSTRACT

Turbo lag is a known impediment of a turbocharged, small displacement engine providing the feel of a large displacement engine. A method of spinning up the exhaust turbine during an interval between the time that the operator moves his/her foot from the brake pedal to the accelerator pedal to initiate a launch. A non-exhaustive list of actions that can be taken to increase exhaust enthalpy provided to the turbine include: opening the throttle, retarding the spark, and closing the wastegate. Additionally, a brake can be applied at one of the vehicle wheels to keep the engine from launching forward during this interval.

16 Claims, 5 Drawing Sheets

VEHICLE LAUNCH ANTICIPATION

CROSS-REFERENCE TO RELATED APPLICATIONS

The present application is a divisional application of U.S. patent application Ser. No. 12/917,592, filed Nov. 2, 2010 now U.S. Pat. No. 8,086,391, which is incorporated herein by reference in its entirety.

BACKGROUND

1. Technical Field

The present disclosure relates to improving the launch performance of a vehicle.

2. Background Art

It is known that a vehicle with a smaller displacement engine exhibits greater fuel efficiency than the same vehicle with a larger displacement engine. However, the ability of the vehicle to accelerate is impaired by the smaller displacement inducting less air into the engine to thereby produce power. It is also known that by pressure charging the engine, performance of the smaller displacement engine, at many operating conditions, can be similar to that of the larger displacement engine. More commonly, pressure charging is provided by a turbocharger in which exhaust enthalpy, which would otherwise be exhausted, is recovered as work in an exhaust turbine. The exhaust turbine has a common shaft with a compressor in the intake. The work extracted in the exhaust turbine is used to compress the intake gases to improve power density of the engine. Turbo lag is a known disadvantage of a turbocharged engine. That is, at low engine speed, such as at vehicle launch, little mass is flowing through the engine so that the exhaust turbine spins at a low speed. The engine/turbo system spins up when demanded by the vehicle operator by depressing the accelerator pedal, however with an undesirable delay. If turbo lag could be addressed, fuel efficiency of vehicles could be significantly improved by downsizing and turbocharging without the performance disadvantage at certain low-speed operating conditions. Any improvement in launch performance may also be applied to naturally-aspirated engines.

SUMMARY

To address launch performance, a vehicle is disclosed which has a brake system, including: brakes coupled to vehicle wheels, hydraulic lines coupled to the brakes, an actuation force on the brakes is related to pressure in the hydraulic lines, and a pressure sensor coupled to the hydraulic lines. The vehicle also includes an internal combustion engine, a turbocharger coupled to the engine, a throttle valve disposed in an intake of the engine, a vehicle speed sensor, and an electronic control unit (ECU) electronically coupled to the engine, the throttle valve, the vehicle speed sensor, and the pressure sensor. An incipient launch of the vehicle is determined when a vehicle speed sensor indicates that the vehicle is stopped and a signature from the signal from the pressure sensor indicates that brake pedal release is imminent. In response, the ECU commands the throttle valve toward a more open position. In one embodiment, brake pedal release is indicated when the pressure sensor indicates that pressure in the hydraulic lines decreases below a threshold pressure. Alternatively, brake pedal release is indicated based on rate of decay of pressure in the hydraulic lines.

The vehicle may include a bypass duct coupled upstream and downstream of an exhaust turbine of the turbocharger and a wastegate valve disposed in the bypass duct. Upon determination of incipient launch of the vehicle, the ECU further commands the wastegate to a substantially completely closed position. In gasoline engine applications, spark plugs are disposed in engine cylinders and electronically coupled to the ECU. The ECU further commands a retarded spark timing to the spark plugs based upon determination of incipient launch of the vehicle.

In some alternatives, the ECU discontinues the commanding the throttle valve to the more open position upon elapse of a predetermined interval. That is, the launch anticipation is aborted when, for example, the operator of the vehicle fails to command a launch within a certain period of time, e.g., when the operator is slowing moving in a parking lot or other slow-speed maneuver.

In some embodiments, the ECU further commands hydraulic pressure to be applied to at least one brake coupled to a vehicle wheel upon determination of incipient launch of the vehicle to avoid an unintended launch feel.

Also disclosed is a method to control a vehicle in which an incipient launch is detected, the incipient launch being when both the vehicle is stopped and an indication that a brake pedal coupled to the vehicle is being released is detected. In response, an increase in engine torque in commanded.

The indication that the brake pedal is being release is based on a signal from a sensor with the sensor being one of: a brake on-off switch coupled to the brake pedal, a brake pedal position sensor coupled to the brake pedal, and a pressure sensor coupled to hydraulic lines of the brake system of the vehicle.

In one embodiment, spark timing is retarded substantially simultaneously with the throttle valve command to the more open position. A method is disclosed in which an incipient launch is determined based on the vehicle being stopped and an indication that release of a brake pedal coupled to the vehicle is imminent. In response, an increase in exhaust enthalpy provided to an exhaust turbine of the turbocharger is commanded. The increase in enthalpy may be provided by: opening a throttle valve coupled to an intake of the engine, retarding spark timing commanded to spark plugs coupled to cylinders of the engine, adjusting timing of a variable camshaft timing (VCT) system coupled to the engine and closing completely a wastegate valve provided in a bypass duct coupled to the exhaust turbine.

In some embodiments, brakes coupled to wheels of the vehicle are actuated substantially simultaneously with the commanding an increase in exhaust enthalpy. The brakes may be actuated to cause the vehicle to remain stopped. Or, the brakes are actuated so as to allow the vehicle to creep. If the brake pedal is reapplied, actions to increase exhaust enthalpy are discontinued. If the accelerator pedal is depressed, then the normal engine operating strategy is employed.

In one embodiment, the actions are applied for forward launches only. The engine is coupled to a transmission having a plurality of forward gears and a reverse gear wherein the commanding an increase in exhaust enthalpy is further based on the transmission being in a forward gear.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
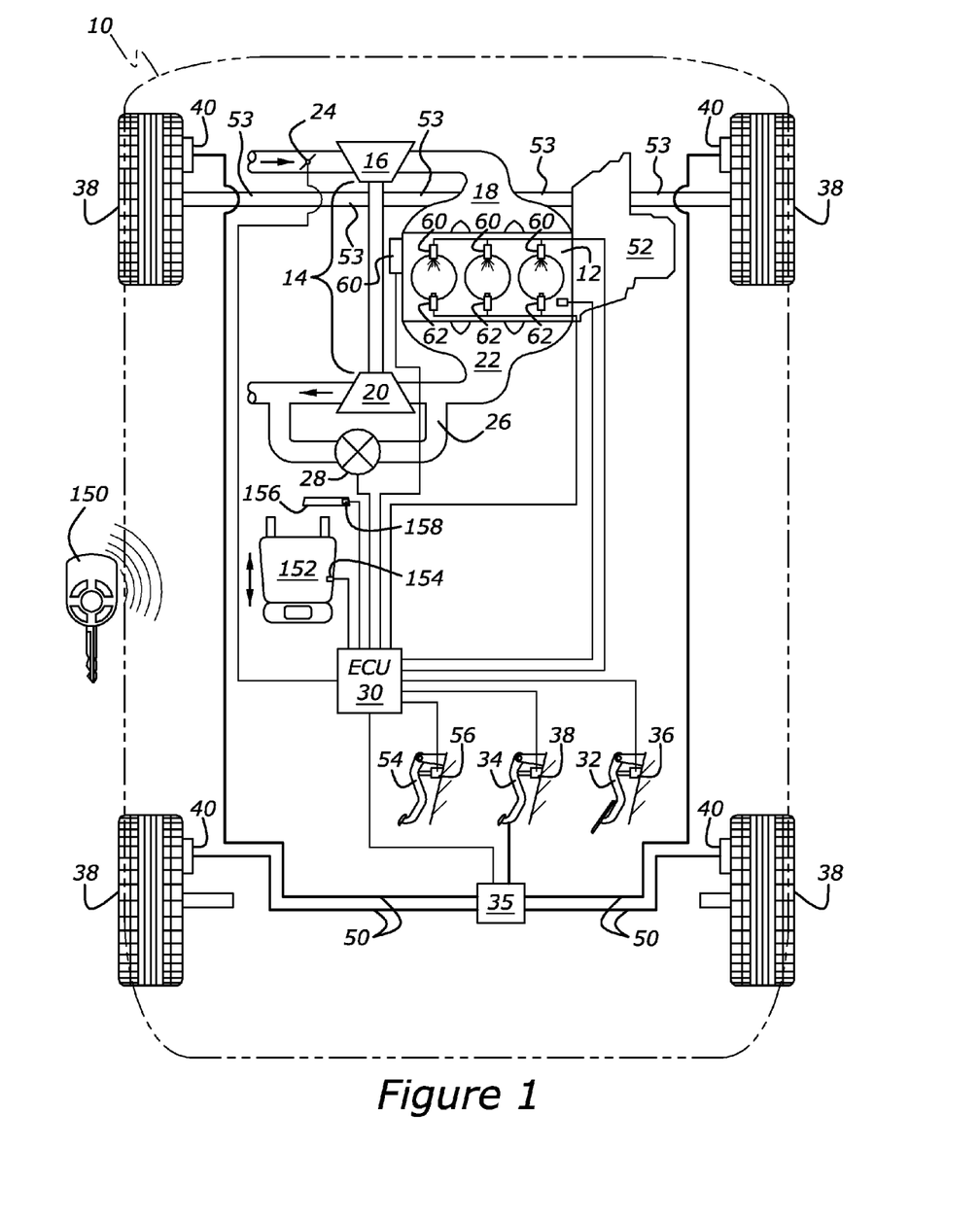
FIG. 1 is a schematic of a vehicle.

In FIG. 1, a vehicle 10 is illustrated that is used to describe several types of vehicle configurations. Not all components shown in FIG. 1 are included in each variation. For example, as described below, the transmission may be an automatic transmission or a conventional manual transmission, the former of which normally includes no clutch pedal, the latter of which does include a clutch pedal. In even other configurations, the transmission is a manual transmission with automatic shifting capability.

Vehicle 10 includes an internal combustion engine 12 with a turbocharger 14. Turbocharger 14 has an exhaust turbine 20 disposed in an exhaust duct 22 of engine 10; a compressor 16 disposed in an intake duct 18 of engine 10; and a shaft 24 coupling turbine 20 and compressor 16. In intake duct 18 is a throttle valve 24 that is actuated under command of an electronic control unit (ECU) 30 to control flow of air into engine 10. A bypass duct 26 to turbine 20 has a valve 28 disposed therein that is actuated under control of ECU 30. Bypass duct 26 and valve 28 are commonly called a wastegate.

In the present disclosure, a single ECU 30 is shown in FIG. 1. However, this configuration is shown for convenience. It is understood that the functions described in reference to ECU 30 may be performed across multiple ECUs.

Vehicle 10 includes operator controls, such as an accelerator pedal 32 and a brake pedal 34, which the operator of the vehicle uses to indicate a desire for forward acceleration. Accelerator pedal 32 is coupled to a sensor 36 that communicates accelerator pedal 32 position to ECU 30. In conventional braking systems, brake pedal 34 is coupled to a brake booster 35 that connects to hydraulic lines and actuates calipers to clamp down on discs at the wheels 38. The operator actuates brake pedal 34 and such actuation is assisted by brake booster 35 to thereby actuate brakes 40 coupled to wheels 38 are actuated. In conventional braking systems, brakes 40 may be actuated independently of operator activity such as for roll stability control or electronic stability control. ECU 30 may command actuation of one or more brakes 40 to improve vehicle stability in response to destabilizing maneuvers or to prevent roll over of the vehicle. The ECU 30 can command a brake to act upon one of the vehicle wheels independent of the operator depressing a brake pedal. Some vehicles are equipped with electric brakes in which brake pedal 34 has a brake sensor 46 to detect operator input to brake pedal 34. The output of brake sensor 46 is provided to ECU 30; and ECU 30 commands a pressure to apply to calipers of brakes 40 based on a signal from sensor 46. A pressure sensor 48 in brake booster 35 indicates the pressure acting upon brakes 40. Pressure sensor 48 is coupled to ECU 30. In such a brake-by-wire configuration, ECU 30 can also command the brakes to be applied to one or more wheels independent of an operator commanding braking by depressing the brake pedal.

Engine 10 is coupled to a transmission 52. In one embodiment, transmission 52 is an automatic transmission with a torque converter. The torque converter causes the vehicle to creep when transmission 52 is in gear and neither accelerator pedal 32 or brake pedal are depressed. In another embodiment, transmission 52 is a conventional manual transmission with a clutch (not individually shown in FIG. 1) coupled between engine 12 and transmission 52. The clutch is controlled by the operator of vehicle 10 by clutch pedal 54. In some embodiments, a clutch pedal sensor 56 may be coupled to clutch pedal 54. A signal from clutch pedal sensor 56 is coupled to ECU 30. In another alternative, transmission 52 is a dual clutch transmission (DCT) that is essentially two manual transmissions in one unit. Odd gears are coupled to one clutch and even gears are coupled to a second clutch. The transmission can be fully automatic with ECU 30 or gear selection is controlled by the vehicle operator. The clutches remain under control of ECU 30. In yet another alternative, transmission 52 is an automatic shifting manual (ASM) that is very much like a conventional manual transmission except that the clutch is under robotic control. The gears may be controlled by ECU 30 or by the vehicle operator. Transmission 52 is coupled to wheels 38 via a drive train including a shaft 53 coupled to vehicle wheels 38. The embodiment in FIG. 1 shows a two-wheel drive configuration. However, the present embodiment applies to any suitable configuration, such as, but not limited to, four-wheel drive vehicles.

Engine 10 has fuel injectors 60 which are coupled to engine cylinders, such as is the case with direct-injection gasoline or diesel engines. In port-injected, gasoline engine, fuel injectors are located in intake manifold 18. Pulse width and timing of the fuel injection is controlled via ECU 30. Fuel injectors 60 are supplied pressurized fuel from a fuel tank via at least one pump, the fuel system not shown in FIG. 1. In a gasoline engine, engine cylinders are also provided with spark plugs 62, the timing of which is controlled by ECU 30. Engine 12 is provided with a variable cam timing (VCT) device 64 to adjust the timing of the intake valves with respect to the piston position. Cam timing is controlled via ECU 30. In other embodiments, an exhaust VCT is provided, also.

Figure 2:
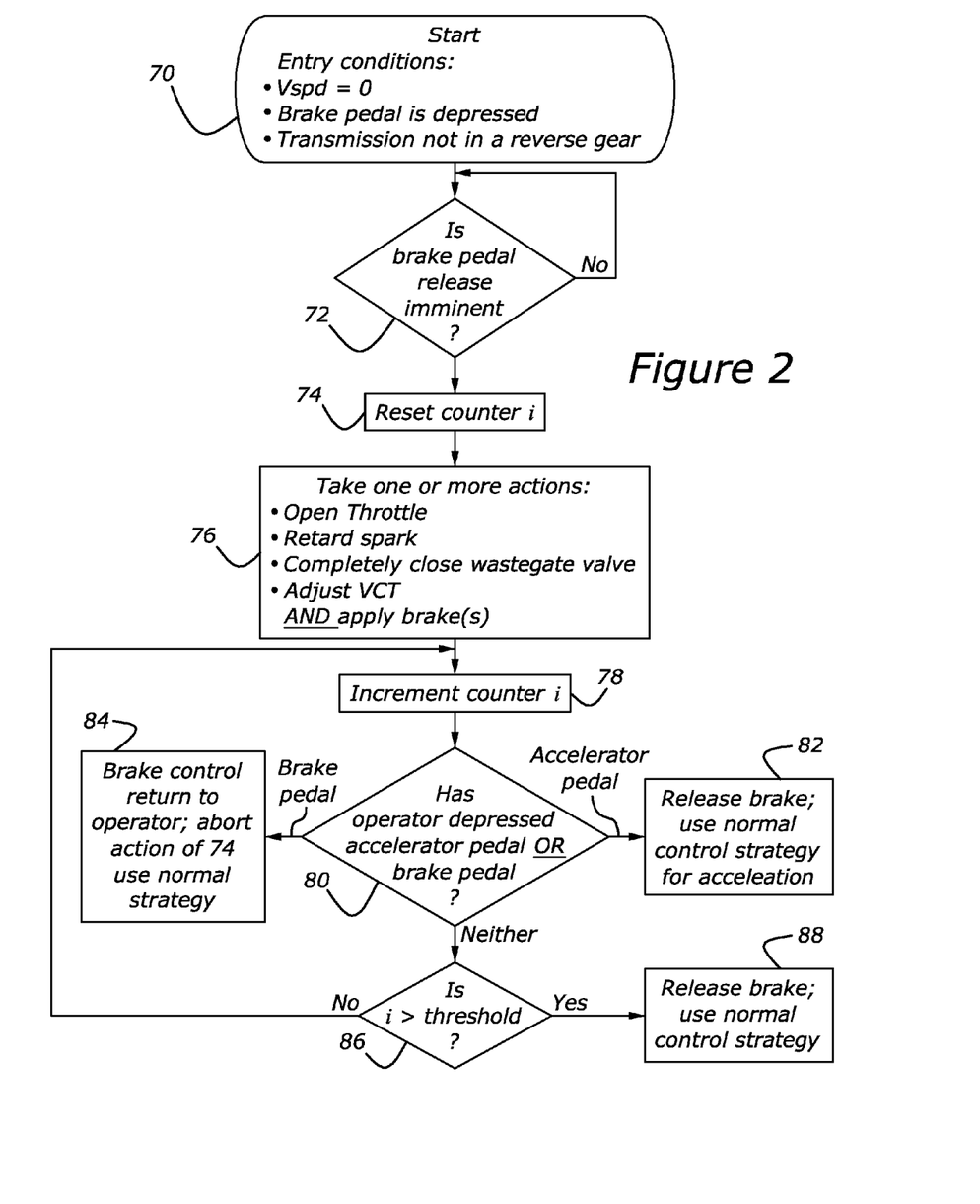
FIG. 2 is a flowchart of an algorithm for launching vehicles according to embodiments of the disclosure.

A flowchart illustrating an embodiment of the disclosure is shown in FIG. 2. The algorithm begins in 70 with entry conditions that vehicle speed is zero, i.e., the vehicle is stopped, that the vehicle operator is depressing brake pedal 34, and transmission 52 is not in a reverse gear. That is, launch performance enhancement is not used for backing up the vehicle. Control passes to decision block 72 in which it is determined whether brake pedal release is imminent. Such determination will be discussed in more detail below. If brake pedal release is not imminent, control remains in decision block 72 until the brake pedal is released or release is imminent, in which case control passes to 74 in which a counter, i, (or alternatively a timer) is reset. Control now passes to block 76 in which actions are taken to cause a greater exhaust enthalpy to be delivered to cause the exhaust turbine to spin up. Such actions may include one or more of: opening throttle valve 24, retarding spark timing, completely closing the wastegate valve 28 in the event that it is not already closed, adjusting the variable cam timing (VCT) system coupled to the engine. When the spark timing is retarded, the amount of torque produced by the engine decreases and the exhaust temperature rises. To counteract the drop in engine rpm that would accompany the torque drop, throttle valve 24 is opened further. In one embodiment, engine rpm is maintained at normal idle rpm. In one alternative, engine rpm is allowed to increase slightly, although not so much to alert an operator of the vehicle. In the embodiment, in which engine rpm is allowed to increase, a vehicle with an automatic transmission would creep forward at a greater rate than would otherwise be the case. To avoid an unexpected forward movement, a brake is applied in block 74 under control of ECU 30. In one embodiment, a brake is applied to at least one wheel to cause the vehicle speed to remain stationary. In another embodiment, the brake is applied to cause the vehicle to creep per a conventional strategy as with a vehicle with a torque converter. In embodiments with ASM or DCT transmissions, when the operator releases the brake pedal, a brake is applied under control of ECU 30 at least in situations where vehicle 10 is on an incline to thereby prevent roll back or roll forward. Typically, in embodiments with a conventional manual transmission, the vehicle operator controls the brakes by actuating the brake pedal. In some situations with a conventional manual transmission, the brake is not applied by ECU 30. In block 78, i is incremented. Control passes to decision block 80, in which it is determined whether the operator has depressed the brake pedal, the accelerator pedal, or neither. If the operator has depressed the accelerator pedal, the brake is released and normal operation ensues in block 82. If the operator has depressed the brake pedal, control passes to block 84 in which brake application by ECU 30 is released and is replaced by brake application due to brake pedal depression by the vehicle operator. Furthermore, actions in block 74 are aborted and normal strategy takes over. If neither are depressed, control passes to block 86 in which counter, i, is compared to a threshold. The actions taken in block 76 are intended to be temporary, e.g., for the 0.5 to 1 sec between the operator removing their foot from the brake pedal to the accelerator pedal to launch the vehicle, i.e., to anticipate the operator's intent to launch. However, for variety of reasons, the operator may not choose to launch, e.g., a car stalls or stumbles in front of them at a traffic light or in parking lot maneuvers. Thus, a counter, or alternatively a timer, is used to limit the predetermined time that the actions in 76 are allowed to run. The predetermined time may be in the range of 0.25 to 3 seconds, although such example is non-limiting. Thus, in decision block 86 if it is found that the counter has exceeded the threshold, control is passed to block 88 in which the normal idle strategy is employed is commanded, i.e., a strategy outside the scope of the present disclosure. If in decision block 86 it is found that the counter has not exceeded the threshold; actions in block 76 are allowed to continue.

Figure 3:
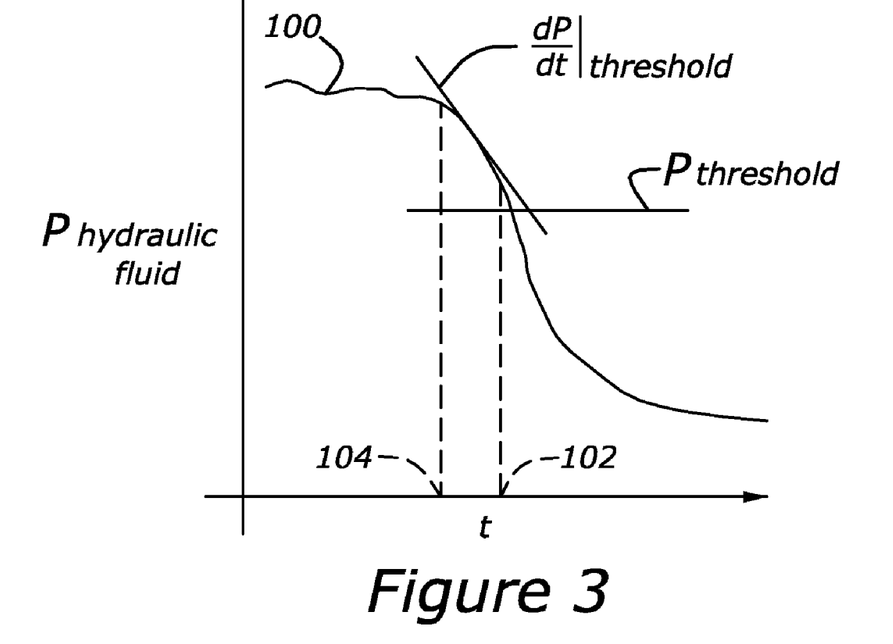
FIG. 3 is a graph of pressure in the hydraulic lines as a function of time during a brake release.

In decision block 72, a determination is made as to whether the brake pedal is being released. In one embodiment, the brake pedal is coupled to an on-off switch and coupled to brake lights on the exterior of the vehicle. When the brakes are determined to be off, the measure(s) to spin up the turbocharger are invoked. In vehicle embodiments that include a pressure sensor in the brake hydraulic lines, the actual release of the brakes may be anticipated by evaluating the signature of the pressure curve when the operator releases the brakes. An example of such a pressure curve as a function of time is shown as curve 100 in FIG. 3. In one embodiment, imminent release of the brake is based on the pressure dropping below a threshold pressure, in which case 102 indicates the time at which imminent brake release is determined and the measure(s) to spin up the turbocharger are invoked. In another embodiment, the measure(s) are based on the rate of decay, dP/dt, being below a threshold dP/dt. (Recall that dP/dt threshold in FIG. 2 is a negative number. Thus, the decay rate is exceeded when the decay rate is below, or more negative, than the threshold rate.) Imminent brake release is 104 for the example rate of decay determination in FIG. 2. To obtain a sufficiently robust derivative of pressure, suitable averaging, filtering, or other techniques may be employed to avoid false detection of imminent brake release.

Figure 4:
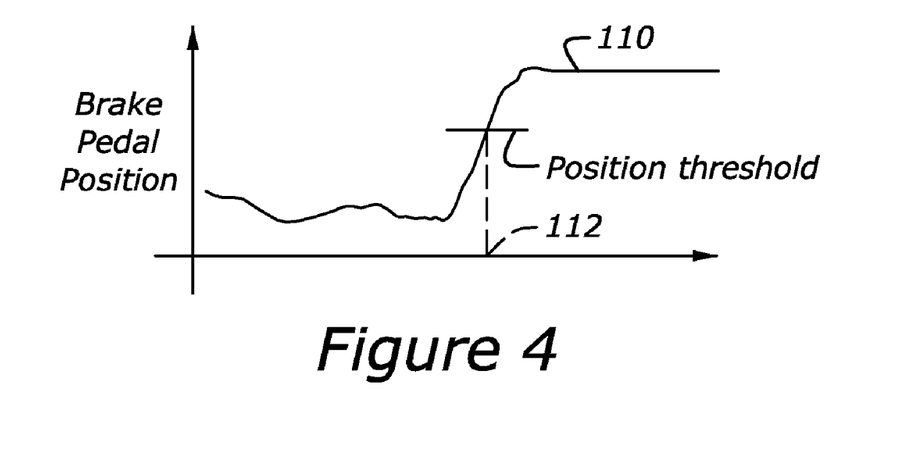
FIG. 4 is a graph of brake pedal position as a function of time during a brake release.

In yet another embodiment, a brake pedal position sensor is provided on the brake pedal. An example curve 110 is shown in FIG. 4 in which the brake is depressed at the left hand side of the graph. At some time later, the operator lifts their foot from the brake pedal and the signal from the position sensor indicates that the pedal rises. At a threshold position, imminent brake release is detected, and shown as occurring at time 112 in FIG. 4.

According to some embodiments of the disclosure, one or more measures are undertaken to spin up the turbocharger that are employed in the time between the operator providing an indication that they are releasing the brake and the time that their foot is on the accelerator pedal. Such interval of time is highly dependent on the driving style of the operator of the vehicle. Some drivers are very casual, releasing the brake and slowly moving their foot over to the accelerator pedal to begin acceleration. Other drivers are aggressive and perform the movement rapidly. The aggressiveness with which the measures to overcome turbocharger lag are employed may be based on the operator's driving style. For example, if the driver is aggressive, the time for spinning up the turbocharger is more limited than for a casual driver. In one embodiment, the measures taken to spin up the turbocharger are applied more aggressively. In some embodiments, the time for applying the measures, i.e., before aborting the measures is based on the expected time until the driver calls for a launch by depressing the accelerator pedal. For example, if the driver takes two seconds between providing an indication of releasing the brake pedal and actually depressing the accelerator pedal, it may be possible to merely open the throttle slightly, possibly with spark retard, to obtain the desired turbocharger speed increase. Also, the time threshold during which the measures are allowed to proceed without aborting the measures to spin up the turbocharger may be increased. That is, for a slower acting operator, the actions to bring the turbocharger to a higher speed may be applied longer in waiting for the operator to depress the accelerator pedal. Consequently, in one embodiment, the driving style of the driver, in regards to time to move from the brake pedal to the accelerator pedal, is determined and the thresholds and the measures associated with spinning up the turbocharger are altered accordingly.

In vehicles without a turbocharger, it is also helpful to prepare for a launch. For example, one of the delays in a naturally-aspirated, spark-ignition engine in providing a fast launch is manifold filling. That is, at idle, the pressure in the manifold may be in the range of negative one-third atmosphere. Bringing the pressure nearer atmospheric to obtain torque quickly at the wheels can take about 0.25 seconds. Launch response can be improved by at least that much by anticipating the operator's intention for a launch. That is, if the throttle valve in the intake is opened slightly prior to the operator depressing the accelerator pedal, the vehicle launch is faster. Retarding spark is not so important in a naturally aspirated engine to improve launch performance. However, it can be employed to bring exhaust aftertreatment devices, such as a three-way catalyst, to temperature in anticipation of an increased NOx engine out emission upon launch. Of course, upon the actual launch when the operator depresses the accelerator pedal, spark timing is advanced to provide the desired torque.

Figure 5:
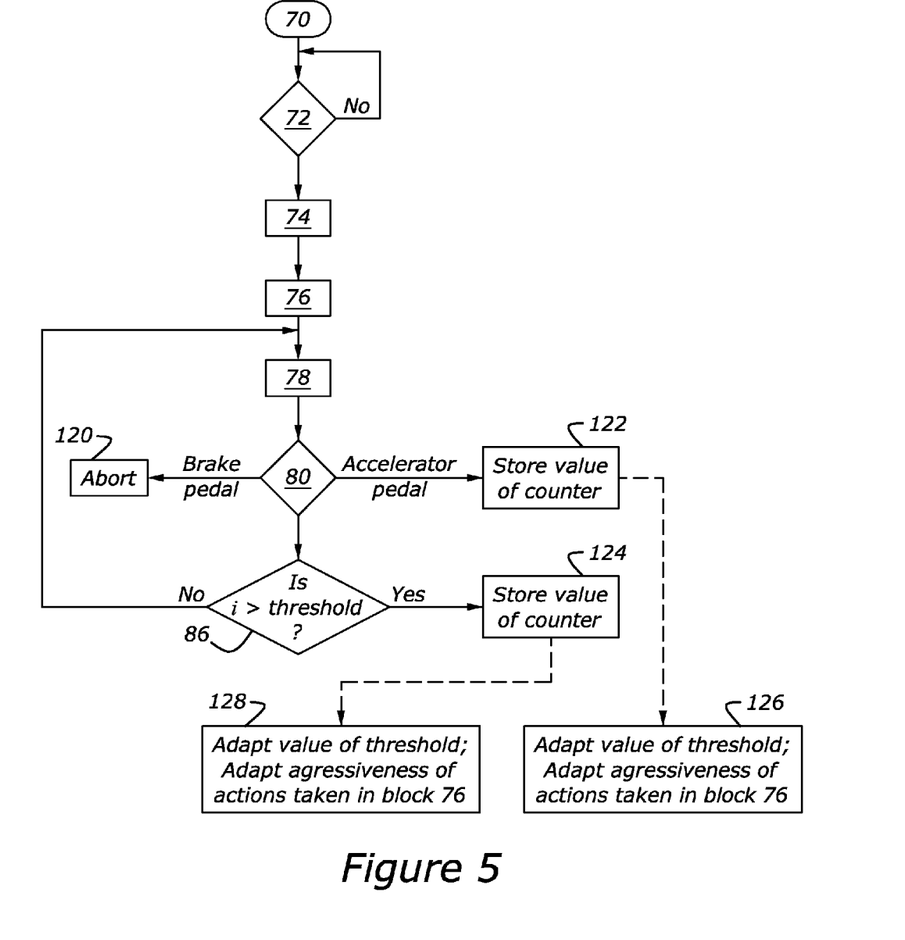
FIG. 5 is an adaptive routine according to an embodiment of the disclosure.

In the example adaptive routine shown in FIG. 5, many of the blocks are similar to those in FIG. 2. The identifying numerals of FIG. 2 are employed here for efficiency's sake. In block 80, in which actuation of brake pedal, accelerator pedal, or neither is queried. If the brake pedal is actuated, the routine of FIG. 5 is aborted in block 120. If the accelerator pedal is depressed, control passes to block 122 in which the value of the counter is stored. The value of the counter indicates the time that it takes for this vehicle operator to move their foot from the brake to the accelerator pedal. If neither pedal is depressed, control passes to block 86 in which it is determined whether the counter has exceeded the threshold. If not, the actions in 78 continue. If the threshold is exceeded by the counter in decision block 86, control passes to block 124 to store the value of the counter. If block 124 is accessed, the vehicle operator has not depressed a pedal in the time allotted for preparation for a launch. This could be due to the operator being a more casual driver and taking more time to call for a launch. Control passes from 124 to block 128 in which the value of the threshold may be adapted (increased) and the aggressiveness of the actions taken in block 76 reduced. From block 122, control passes to block 126 in which the value of the threshold may be adapted (decreased) and the aggressiveness of the actions taken in block 76 increased.

In FIG. 5, the algorithm shows a dashed link between blocks 122 and 126 and between blocks 124 and 128. According to one embodiment, the adaptations in blocks 126 and 128 are not performed for each time that a counter value is stored. Instead, multiple values of the counter are determined before adapting the routine. For example, a more aggressive driver may be in a parking lot and does not perform a launch. Thus, the counter exceeding the threshold does not indicate a change in the driver's general style, but a different driving scenario. Thus, adaptations in block 126 and 128 are performed after collecting data from multiple launches. Furthermore, the adaptation may be slowly invoked. E.g., if the last 10 launches have occurred with counter, i, well below the threshold, the threshold may be reduced in block 122. However, rather the reduction would be limited and only after several adaptations would the value of the threshold approach the value appropriate for the current driver. Of course, vehicle may have multiple drivers with varying driving styles. In such a case, the adaptations would adjust slowly for the current driver. Or, if the driver changes rapidly, little or no adaptation takes place as the values of the counter vary so widely so that no new direction is clearly indicated.

Different operators of the vehicle are likely to have varying driving styles. The launch interval, i.e., time from brake pedal release until accelerator pedal depression, may vary greatly from driver to driver. Thus, in some embodiments, a launch interval is determined for each operator, i.e., a launch interval is associated with each operator. The operator may be detected by the key fob 150 (as shown in FIG. 2) that is used. In one embodiment, adjustment of the driver's seat 152 as determined by a sensor 154 is used to distinguish among operators of the vehicle. Or, in another embodiment, sensor 154 is a weight sensor that can be used to distinguish among operators of the vehicle. Alternatively, position sensor 158 is coupled to a mirror 156 is used to detect a particular operator. In yet another embodiment, driving style, such as rate of depressing the accelerator pedal, aggressiveness of braking maneuvers, etc. are used to detect the driver of the vehicle.

If the launch interval is relatively short, the action or actions taken to prepare for the launch are undertaken more aggressively. In one embodiment, engine speed is increased during the launch interval. One action to increase engine speed is to open the throttle valve to a greater angle when the launch interval is shorter. In an alternative embodiment, the rate at opening the throttle valve can be greater when the launch interval is shorter.

In embodiments with a turbocharger coupled to the engine, it may be useful to retard the spark timing or injection timing to increase exhaust enthalpy to the turbocharger. The rate at which these actions are taken or the magnitude of the action are increased when the launch interval is decreased.

The term timer counter is used in reference to FIG. 2. In one embodiment, the algorithm is performed on a clocked basis, e.g., every 100 msec. In such a case, the counter is proportional to time and can be used directly. Alternatively, the counter should be related to real time so that the algorithm is not skewed by the time it takes to perform portions of the algorithm. In another alternative, a timer based on a clock is used in place of the counter.

Figure 6:
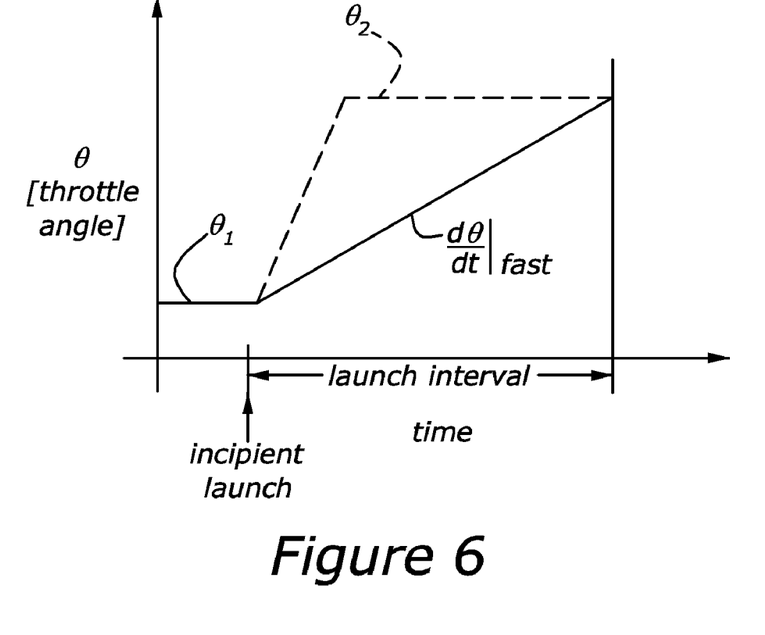
FIGS. 6 and 7 are plots of example applications of anticipating vehicle launch according to multiple embodiments of the disclosure.
Figure 7:
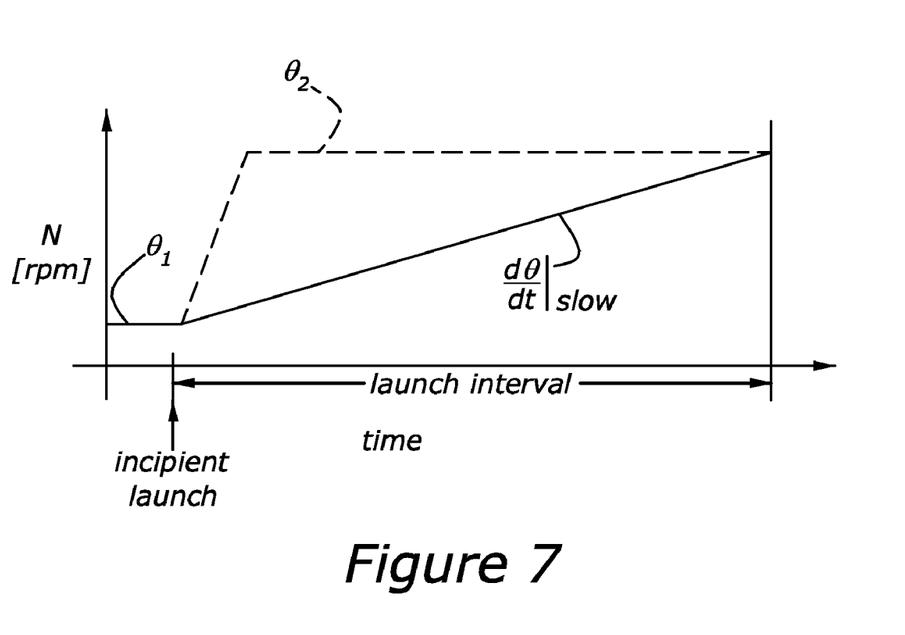

Referring to Figures and 7, two example launch intervals are shown, fast and slow, respectively. Before incipient launch, the throttle angle is at a first throttle angle, i.e., for normal engine idle. When incipient launch is detected, in one embodiment, the throttle valve is commanded more open to a second throttle angle, as shown by a dotted line. The second throttle angle is maintained until the end of the launch interval or until the operator of the vehicle intervenes by depressing on the accelerator pedal. Alternatively, the throttle valve is opened progressively over a period of time, shown as $d\theta/dt$, fast and $d\theta/dt$, slow in FIGS. 6 and 7, respectively. When it is known that the operator has a more rapid driving style, the throttle is opened more rapidly to sufficiently prepare for the launch, per FIG. 6. Conversely, the throttle is opened more slowly in FIG. 7. In some applications, it may be desirable to open the throttle more slowly to be less distracting to the operator of the vehicle. In other applications, it may be desirable to open the throttle directly to the desired position to ensure an aggressive launch feel. Or, in other applications, a combination may be employed.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:
1. A vehicle, comprising:
a brake system, including: brakes coupled to vehicle wheels; hydraulic lines coupled to the brakes, an actuation force being applied on the brakes from a pressure in the hydraulic lines; and a pressure sensor coupled to the hydraulic lines;
an internal combustion engine;
a turbocharger coupled to the engine;
a throttle valve disposed in an intake of the engine;
a vehicle speed sensor; and an electronic control unit (ECU) electronically coupled to the engine, the throttle valve, the vehicle speed sensor, and the pressure sensor, the ECU commanding the throttle valve from a first position toward a more open second position when the vehicle speed sensor indicates that the vehicle is stopped and a signature from a signal from the pressure sensor indicates that brake pedal release is imminent.

2. The vehicle of claim 1 wherein the brake pedal release is indicated when the pressure sensor indicates that the pressure in the hydraulic lines decreases below a threshold pressure.

3. The vehicle of claim 1 wherein the brake pedal release is indicated based on a rate of decay of the pressure in the hydraulic lines, the pressure in the hydraulic lines being indicated by the pressure sensor.

4. The vehicle of claim 1, further comprising:
a bypass duct coupled upstream and downstream of an exhaust turbine of the turbocharger; and
a wastegate valve disposed in the bypass duct and electronically coupled to the ECU, wherein when the vehicle speed sensor indicates that the vehicle is stopped and the signature from a signal from the pressure sensor indicates that brake pedal release is imminent, the ECU further commands the wastegate valve to a substantially completely closed position.

5. The vehicle of claim 1, further comprising:
spark plugs disposed in engine cylinders and electronically coupled to the ECU, wherein, when the vehicle speed sensor indicates that the vehicle is stopped and the signature from a signal from the pressure sensor indicates that brake pedal release is imminent, the ECU further commands a retarded spark timing to the spark plugs.

6. The vehicle of claim 1, wherein the ECU discontinues the commanding the throttle valve to the more open second position upon elapse of a predetermined interval.

7. The vehicle of claim 1, wherein the ECU further commands hydraulic pressure to be applied to at least one of the brakes coupled to a vehicle wheel when the vehicle speed sensor indicates that the vehicle is stopped and the signature from a signal from the pressure sensor indicates that brake pedal release is imminent.

8. The vehicle of claim 1, further comprising a variable camshaft timing (VCT) system coupled to the engine, wherein when the vehicle speed sensor indicates that the vehicle is stopped and the signature from a signal from the pressure sensor indicates that brake pedal release is imminent, the ECU adjusts timing of intake valves of the VCT system.

9. The vehicle of claim 1, further comprising a brake sensor coupled to a brake pedal, and wherein the ECU discontinues commanding the throttle valve from the first position toward the more open second position when a signal from the brake sensor indicates that the brake pedal has been depressed.

10. The vehicle of claim 1, further comprising an accelerator pedal sensor coupled to an accelerator pedal coupled to the vehicle, and wherein the ECU discontinues commanding the throttle valve from the first position toward the more open second position when a signal from the accelerator pedal sensor indicates that the accelerator pedal has been depressed.

11. The vehicle of claim 1, further comprising a transmission coupled to the engine, the transmission having a plurality of forward gears and a reverse gear, wherein the commanding the throttle valve from the first position toward the more open second position occurs when the transmission is in a forward gear.

12. A vehicle, comprising:
a brake system, including: brakes coupled to vehicle wheels; hydraulic lines coupled to the brakes, an actuation force being applied on the brakes from a pressure in the hydraulic lines; and a pressure sensor coupled to the hydraulic lines;
an internal combustion engine;
a turbocharger coupled to the engine;
a throttle valve disposed in an intake of the engine;
a vehicle speed sensor; and
an electronic control unit (ECU) electronically coupled to the engine, the throttle valve, the vehicle speed sensor, and the pressure sensor, the ECU commanding the throttle valve from a first position toward a more open second position when a vehicle speed sensor indicates that the vehicle is stopped and a signal received by the ECU indicates that brake pedal release is imminent.

13. The vehicle of claim 12, wherein the indication that release of the brake pedal is imminent is based on a signal from the pressure sensor coupled to the hydraulic lines.

14. The vehicle of claim 12, further comprising a brake pedal position sensor coupled to a brake pedal, wherein the indication that release of the brake pedal is imminent is based on a signal from the brake pedal position sensor.

15. The vehicle of claim 12, further comprising a brake on-off switch coupled to a brake pedal, wherein the indication that release of the brake pedal is imminent is based on a signal from the brake on-off switch.

16. A vehicle, comprising:
a brake system, including: brakes coupled to vehicle wheels; hydraulic lines coupled to the brakes, an actuation force being applied on the brakes from a pressure in the hydraulic lines; and a pressure sensor coupled to the hydraulic lines;
an internal combustion engine;
a turbocharger coupled to the engine;
a throttle valve disposed in an intake of the engine;
a vehicle speed sensor; and
an electronic control unit (ECU) electronically coupled to the engine, the throttle valve, the vehicle speed sensor, and the pressure sensor, the ECU determining an incipient launch of the vehicle when the vehicle speed sensor indicates that the vehicle is stopped and a signature from a signal from the pressure sensor indicates that brake pedal release is imminent and commanding the throttle valve from a first position toward a more open second position in response to the determination of incipient launch of the vehicle.

* * * * *